July 19, 1960    J. M. SHEESLEY    2,945,475
ACTUATING DEVICE
Filed May 4, 1956    5 Sheets-Sheet 1
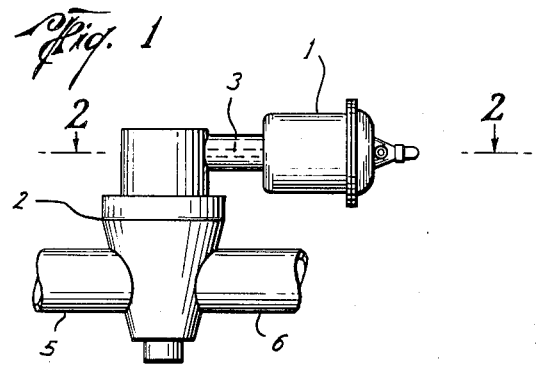
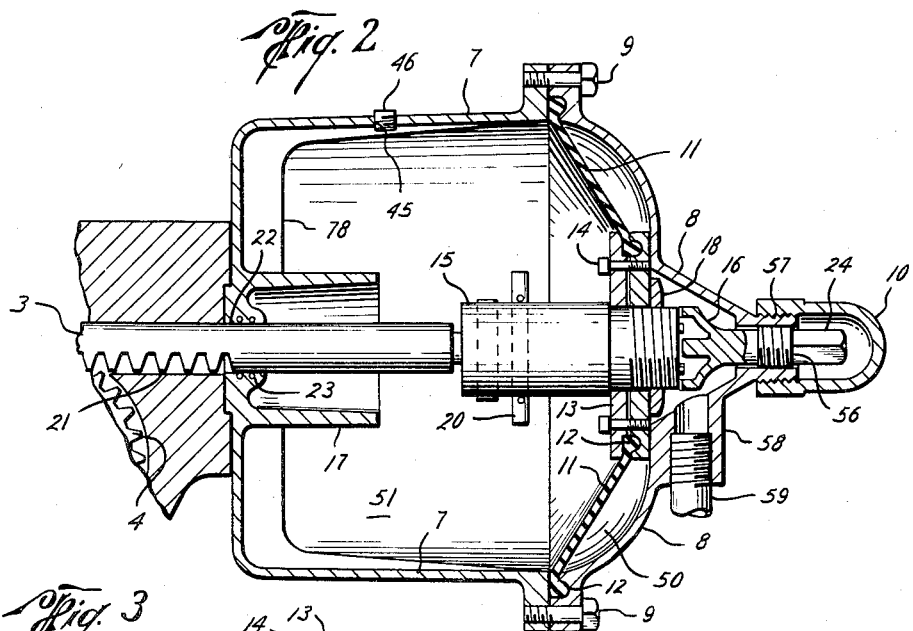
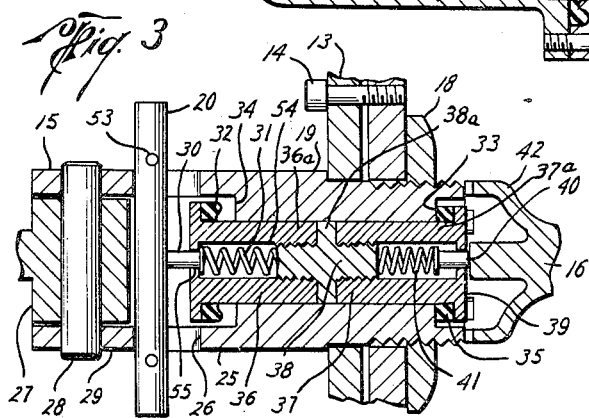
John M. Sheesley
INVENTOR.

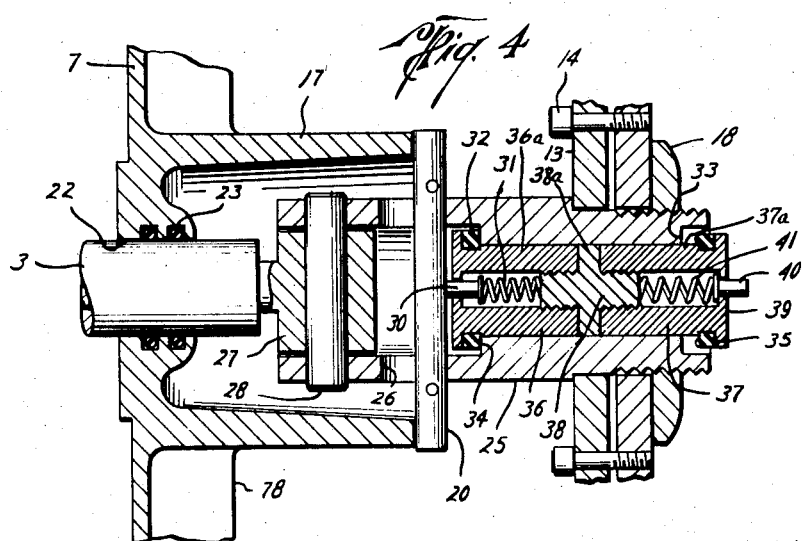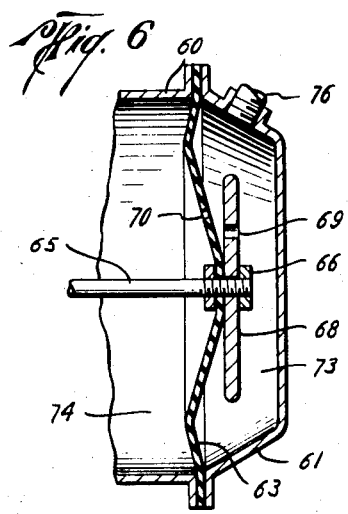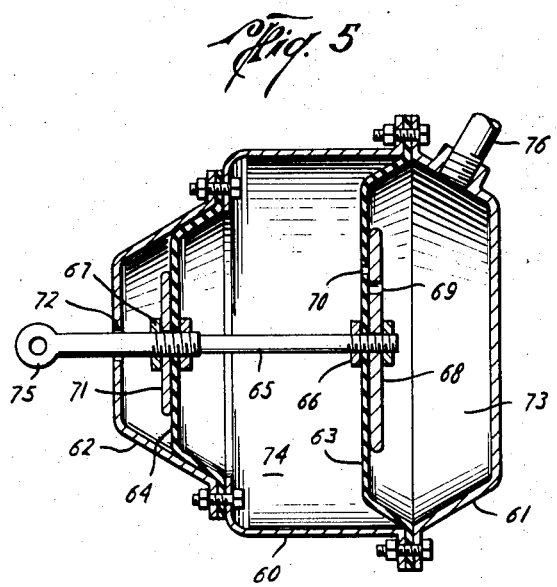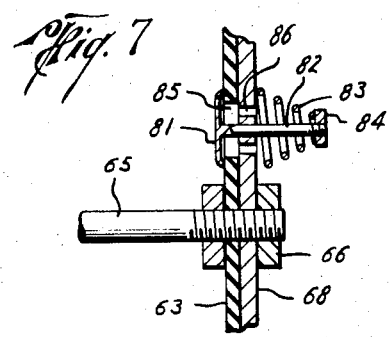
John M. Sheesley
INVENTOR.

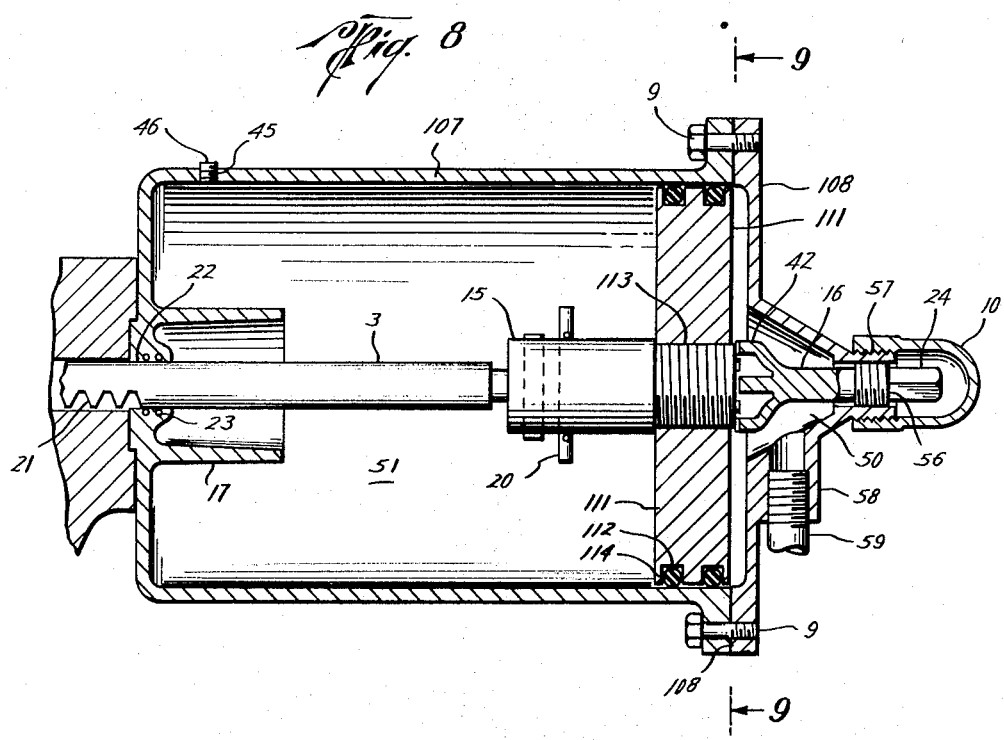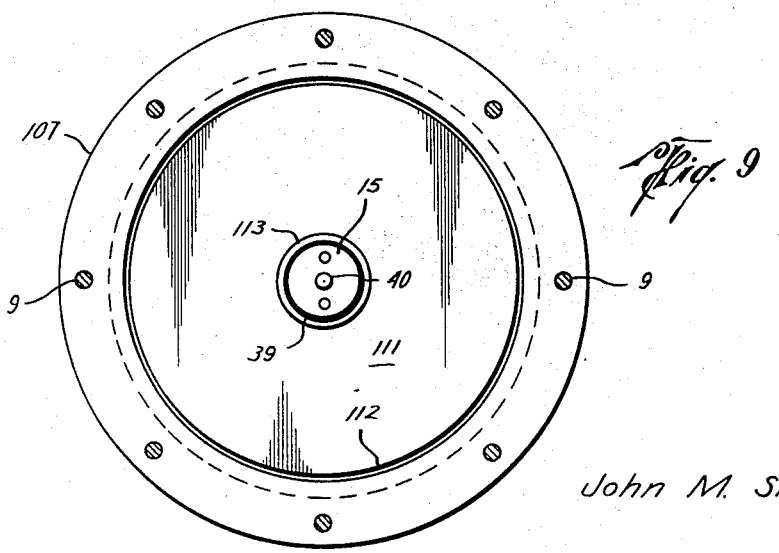

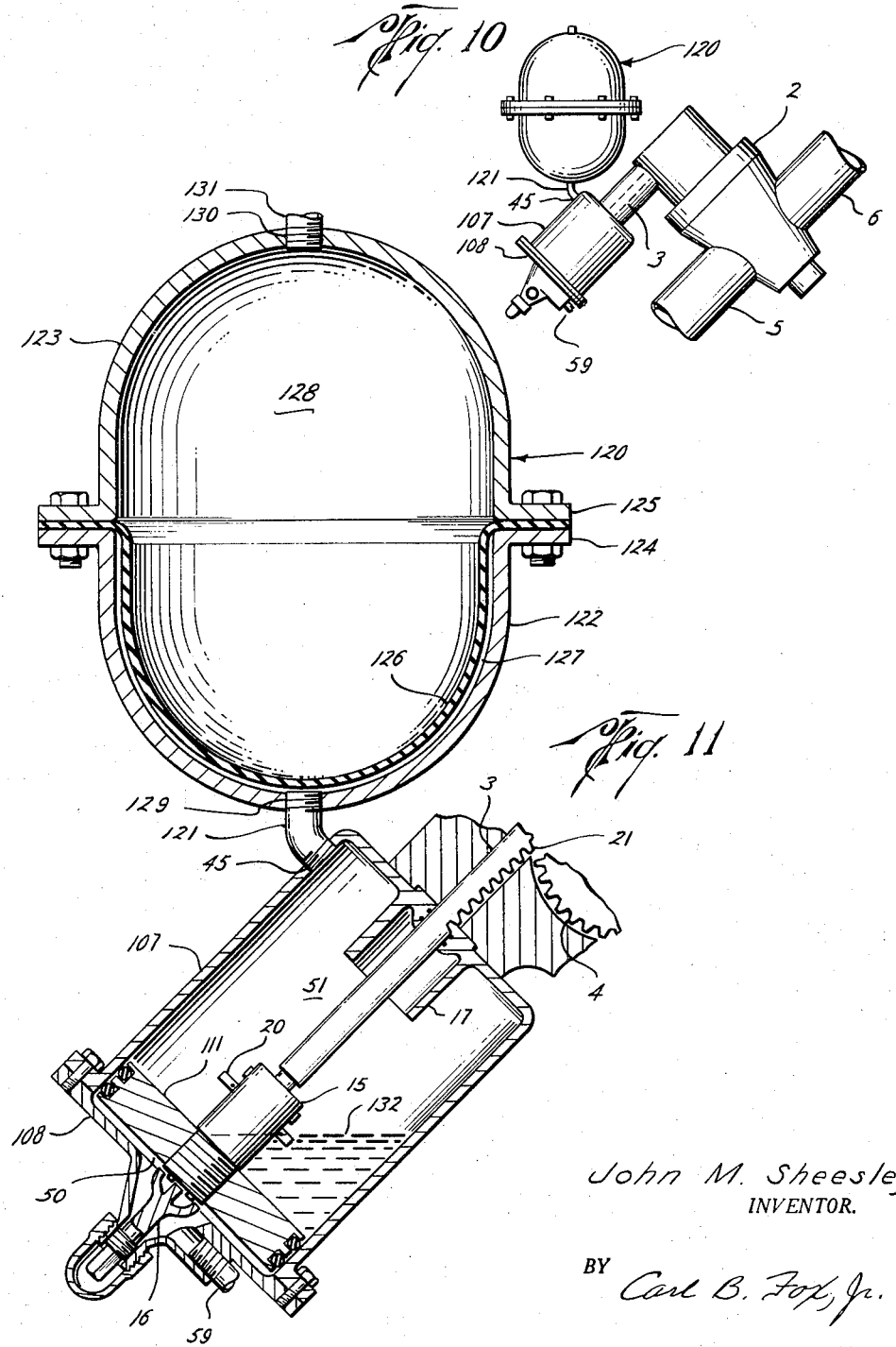

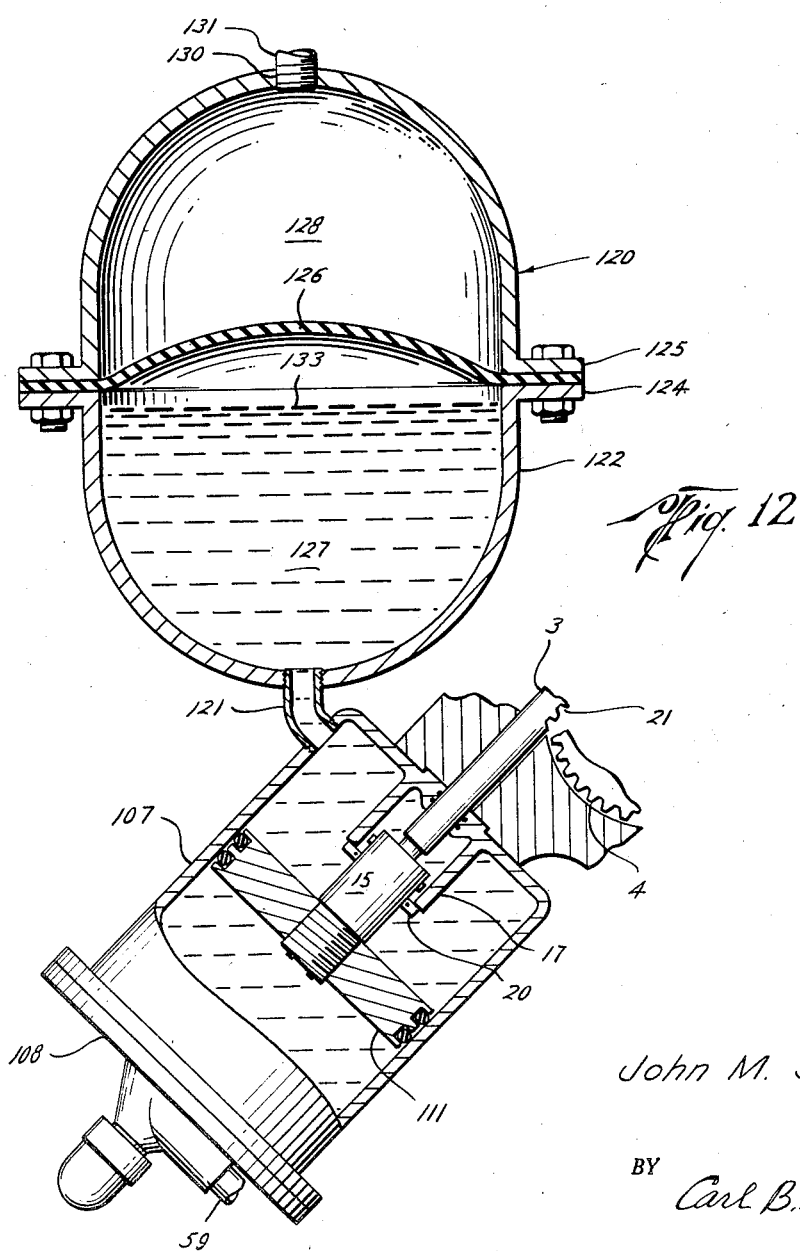

United States Patent Office 2,945,475
Patented July 19, 1960

2,945,475

ACTUATING DEVICE

John M. Sheesley, Houston, Tex., assignor to Research Engineering Company, a corporation of Texas Filed May 4, 1956, Ser. No. 582,880

11 Claims. (Cl. 121—38)

This invention relates to a new and useful operator or actuator, that is, to a new and useful device for moving an element of an apparatus to control the apparatus, and the like. This invention also relates to improvements in actuators.

This application is a continuation-in-part of application Serial Number 514,994, filed June 13, 1955, by John M. Sheesley, the present applicant, and entitled "Actuating Device," which application is now abandoned.

Most often the actuator of this invention will be used to move an element of an apparatus between operative and inoperative positions or between open and closed positions, but the actuator is of general application and use.

This actuator, briefly described, operates the elements by way of a shaft or other means connected to a movable barrier means flexed or moved under the influence of fluid pressure differentials. An important feature of this actuator is that the fluid pressures on both sides of the barrier means are controlled from one side of the barrier means through a single pipe or conduit communicating only with that side. Suitable barrier means may be diaphragms, pistons, and the like.

The concept of using a diaphragm means to convert pressure energy into kinetic, or motion, energy is undeniably well-known and is used widely in practical applications. The use of piston means is more widely known. It is additionally well-known to incorporate these means into actuating devices. But most of the known devices require multiple-acting valves and multiple piping systems for control of their operation as, for example, two gas pressure pipes to act on the two sides of the barrier means and one or more four-way valves to control the pressuring gas flow. Many actuating devices require complex valve systems in addition to the multiple piping systems.

The actuator herein described is an important improvement over the actuators presently known in the art. By including a simple valve system in the actuator in a novel way it is now possible to control the actuator through a single pipe or conduit. This is especially important in the case of actuators situated at a distance from the control station because of the saving in pipe over actuator installations requiring two or more pipes for controlling the actuator.

This actuator, in the embodiments particularly described, is operated by a compressed fluid acting on the surfaces of a diaphragm or piston means. In most cases compressed air will be used to operate the actuator but other gases and liquids may be used. If compressed air or other relatively non-corrosive fluids are used, the actuator may be constructed of steel, but if desired or if more corrosive fluids are used the actuator may be constructed of other materials. The diaphragms may be sheets of neoprene or rubber, or other materials such as plastics or metals. The piston means may be any of the well-known types, and is usually made of metal, but can be made of other materials such as plastics and the like.

One object of this invention is to provide an actuator operable at a remote location which is controlled by varying the fluid pressure in a single conduit running between the control point and the actuator.

Another object of this invention is to provide an actuator having a double-acting barrier means capable of being moved in both directions by a compressed fluid supply communicating with only one surface of the barrier means.

Another object of this invention is to provide a novel valve arrangement between the two compartments of an actuator.

Another object of this invention is to provide an actuator wherein the valve between the compartments at either side of a barrier means is mounted in the barrier means.

A further object of this invention is to provide an actuator operable by means of pressure differentials across barrier means in which either high or low fluid pressure may be used.

Other uses, advantages, objects, and improvements of this actuator over the prior art will be apparent from a consideration of the specification, claims, and drawings, of which:

Figure 1 is an elevational view of the preferred embodiment of the actuator and a plug valve operable by the actuator;

Figure 2 is a sectional plan view of the embodiment of the actuator shown in Figure 1, taken at line 2—2 of Figure 1;

Figure 3 is an enlarged sectional view of the check valve and a stop of the actuator shown in Figure 2;

Figure 4 is a sectional view of the check valve shown in Figure 3 moved against a stop opposite to the stop shown in Figure 3;

Figure 5 is a section of a second embodiment of the actuator;

Figure 6 is a partial section of the embodiment shown in Figure 5 showing the operation of the check valve;

Figure 7 is a partial section showing an alternative check valve for the embodiment of the invention shown in Figures 5 and 6;

Figure 8 is a sectional plan view of a modification in which a piston replaces the diaphragm of Figures 1-4;

Figure 9 is a section taken at line 9—9 of Figure 8;

Figure 10 is an elevational view of a liquid-operated modification of the invention;

Figure 11 is a partial vertical section of the modification of the invention shown in Figure 10; and, Figure 12 is the same as Figure 11 with the barrier means in a moved position.

Referring now to the drawings in detail, Figures 1-4 show a preferred embodiment of the invention having a single diaphragm. In Figures 1 and 2 the actuator 1 is shown positioned to operate a plug valve 2 through a shaft 3 having a rack portion 21. The actuator 1 moves the shaft 3 in a direction corresponding to the longitudinal axis of shaft 3 and the rack 21, which engages gear 4 of valve 2, rotates gear 4 and also rotates the stem (not shown) of valve 2 to open or to close valve 2 in the usual manner. The use of the actuator is not limited to the operation of plug valves, but many other devices may be operated by the actuator by devising installations which will be apparent to persons skilled in the art. In Figure 1, pipes 5 and 6 are the inlet and outlet conduits connected to valve 2. Shaft 3 is indicated by dotted lines in Figure 1.

In Figures 2 to 4, the housing of the actuator is formed by shell 7 and cover 8. Shell 7 may be reinforced by web members 78 if desired. Diaphragm 11 is clamped between suitable flanges of shell 7 and cover 8 by bolts 9, as shown. Other means may be used to clamp cover 8 to shell 7, but the means shown is usual and satisfactory. Diaphragm 11 may be flat, or concave as shown in Figure 2, and has a hole near its center into which a check valve, indicated generally by reference numeral 15, is clamped. Check valve 15 is shown clamped in the center hole of diaphragm 11 by clamps 13 and threaded flange 18, which is better shown in Figure 3. Clamps 13 grip diaphragm 11 and are bolted together by bolts 14. The beaded edges provided on diaphragm 11 are securely held in the rabbets in the flanges of cover 8 and in clamps 13. Flange 18 is screwed onto a threaded portion of check valve 15 and holds clamps 13 tightly against shoulder 19 provided on check valve 15. Other means for securing check valve 15 in the center hole of diaphragm 11 may be used. A compartment 50 is formed by cover 8 and diaphragm 11, and a compartment 51 is formed by shell 7 and diaphragm 11. Shaft 3 is connected axially to cylindrical plug 27, which is inserted into one end of check valve 15 and fastened in place by pin 28 as shown in Figures 3 and 4. Shaft 3 extends through a hole 22 in shell 7, where a seal is provided by one or more O-rings 23 or other suitable packing means, so that shaft 3 will slide longitudinally in hole 22 and so that there will be no leaks into or out of shell 7 at that point. Rack 21 of shaft 3 engages gear 4 of a plug valve 2, or shaft 3 may engage other apparatus as desired. Shaft 3 may have means other than rack 21 for engaging the other apparatus. Shell 7 has an interiorly protruding stop 17, which is shown as an open-ended cylinder made integrally with shell 7, but which may be provided in other forms. Check valve 15 has a bumper rod 20 which contacts stop 17 when check valve 15 is moved to that end of the actuator as shown in Figure 4. A stop 16 having fingers 42 engages check valve 15 at the opposite end of the actuator toward cover 8.

Check valve 15 is shown in greater detail in Figures 3 and 4. Valve body 25 is substantially cylindrical in shape, and has a plug opening to receive plug 27 at one end and a double seat portion at the other end. Between the plug opening and the seat portion, two oppositely disposed slots 26 receive bumper 20 which is held in place by pins 53 as shown. Bumper 20 as shown is a flat bar or rod which slides in slots 26 in valve body 25. Valve seats 33 and 34 are formed in valve body 25 by a section thereof having a smaller internal diameter, the valve seats being annular with respect to valve body 25. Valve 15 has a valve spool formed by two identical end elements 36 and 37 which are both screwed onto a center element 38. End elements 36 and 37 have valve portions 32 and 35, which are shown as rings of a packing material encircling the end elements opposite seats 34 and 33, respectively. The end elements 36 and 37 each has a center bore 54 in which springs 31 and 41 are placed to act between buttons 30 and 40 and center element 38. Button 30 abuts bumper 20 and enters end element 36 through an end hole, there being an enlarged flat portion of button 30 adapted to contact spring 31. Button 40 is disposed in a similar end hole in end element 37 and has an enlarged portion adapted to contact spring 41. Button 40 is centrally positioned to abut the center member of stop 16 when check valve 15 is moved to that end of the actuator by flexure of diaphragm 11. A space between elements 36—38 and the interior wall of the valve body 25 permits passage of gases through the valve. This space may be provided by the grooves or slots formed between the spaced longitudinal ribs 36a, 37a, 38a, a plurality of which are formed around the corresponding elements. Each rib is formed by the aligned ribs on each of the three elements 36—38, so that the ribs and gas passage grooves therebetween are continuous. These ribs, besides permitting the gas passage through the valve, slidingly engage valve body 25 and thus also serve to center the valve spool in the valve body.

As will be readily understood from the drawings, when diaphragm 11 is extended or flexed into compartment 50 as shown in Figures 2 and 3, check valve 15 is brought into contact with stop 16. Button 40 is then pressed into end element 37 and spring 41 is compressed between button 40 and element 38. When diaphragm 11 is flexed in the other direction into compartment 51, check valve 15 is brought into contact with stop 17 through bumper 20, the protruding ends of which contact stop 17 as shown in Figure 4. Button 30 is pressed into end element 36 and spring 31 is compressed between button 30 and element 38. When check valve 15 is moved between stops 16 and 17, shaft 3 slides inwardly and outwardly through hole 22 in housing 7, and rack 21 turns gear 4. Shaft 3 and diaphragm 11 hold check valve 15 along the center line of the actuator.

Stop 16 is adjustable along the line of movement of shaft 3 and check valve 15 by means of threaded portion 56 shown in Figure 2. Cap 10 is screwed onto a threaded nipple 57 of cover 8, as shown. Nipple 57 is also internally threaded to receive stop 16, the position of which can be adjusted by turning knob 24 thereby screwing stop 16 to a position closer to or farther from stop 17. This adjustment alters the length of the movement, or stroke, of shaft 3 when the actuator is operated, depending on the stroke required to operate the apparatus attached to shaft 3 of the actuator. On each stroke, shaft 3 moves the distance between the stops, as does valve 15 to which it is connected.

Cover 8 also has an internally threaded outlet 58 adapted to receive gas or air line 59. Line 59 is connected to a compressed gas or air supply (not shown) and by adjustment of suitable valve means (not shown) included in line 59 may be also vented to the atmosphere. In a simple yet convenient arrangement, line 59 is connected to a three-way valve which may be positioned to supply compressed air to the actuator through line 59 and which may also be positioned to vent the actuator to the atmosphere through line 59 and the three-way valve. In some installations it will not be desirable to vent line 59 to the atmosphere. It may be that a valuable gas is used to operate the actuator, in which case the gas may be vented to a zone of lower pressure than the initial pressure and recovered. The actuator in any of its embodiments may be operated between zones of sufficiently differing pressure, so that valuable or waste gases or air may be used to operate the actuator.

The actuators in the embodiments shown in Figures 1–7 may be operated by a low pressure gas supply or by a high pressure gas supply. The low pressure gas supply may be about 15 to 20 p.s.i., and the high pressure gas supply may be from about 24 p.s.i. upward to practical limits. High pressure gas supply pressures of 50 to 100 p.s.i. are entirely satisfactory, and higher pressures may be used. The actuator having pistons or other barrier means instead of a diaphragm or diaphragms, exemplified in Figures 8 and 9 of the drawings, may also be operated by a high or low pressure gas supply, and there is no limit to the magnitude of pressures that may be used.

When a low pressure gas supply pressure is used, that is, in the range 15 to 20 p.s.i., it is preferred to provide a larger space on the left-hand side of diaphragm 11. This may be done by attaching an accumulator similar to the accumulator shown in Figures 10–12 to the outlet 45 shown in Figure 2. When a high pressure gas supply is used, outlet 45 is plugged with a threaded plug 46, as shown. When only low gas pressures are to be used, the actuator may be made having a larger gas space on the left-hand side of diaphragm 11, and then no accumulator will be necessary. However, in the preferred embodiment shown in Figure 2, the actuator may be used with either high or low gas pressures by providing an accumulator when low gas pressures are used.

In operating the embodiment of the invention shown in Figures 1–4 of the drawings, diaphragm 11 and check valve 15 are initially in the position shown in Figures 2 and 3 with diaphragm 11 flexed into compartment 50 and with check valve 15 in contact with stop 16. As shown in Figure 3, the valve 15 will be closed at seat 33 nearest stop 16 and open at seat 34. Spring 41 is compressed by stop 16 acting through button 40, thereby displacing the spool in the valve body as shown. Compressed air at at least 24 p.s.i. pressure is introduced into compartment 50 through line 59 and outlet 58. As the pressure increases inside compartment 50, no air will pass through check valve 15 because the pressure will tend to keep check valve 15 closed at seat 33. Diaphragm 11 will be flexed away from stop 16 and shaft 3 will move longitudinally through hole 22, turning gear 4. After check valve 15 has moved into contact with stop 17, as shown in Figure 4, bumper 20 will move button 30 against spring 31, compressing it, and the spool will move to the other seat 34 in the valve body, tending to close the check valve 15 at seat 34. When check valve 15 is in contact with either stop 16 or stop 17, the valve will tend to close at the seat corresponding to the spring then compressed. But the check valve is then held seated only by a relatively weak spring under compression and may be unseated by a pressure differential across the diaphragm sufficiently great to overcome the spring. Thus, when check valve 15 is in contact with either stop 16 or stop 17, check valve 15 will tend to seat because of the compression of one of the springs 31 and 41, but a pressure opposing the spring on the inside of the seated valve will raise the seat and permit the pressures in compartments 50 and 51 to substantially equalize. Springs 31 and 41 are weak springs, such that when a higher pressure exists in one of the compartments 50 or 51, the pressure will overcome the spring and keep the valve closed. Spring 31 will not keep the valve seated at 34 if a relatively higher pressure exists in compartment 50, even though button 30 has compressed spring 31. Similarly, spring 41 will not keep the valve seated at 33 if a relatively higher pressure exists in compartment 51, even though button 40 has compressed spring 41. Since the distance between seat 34 and the end of slots 26 is greater than the thickness of the spool end flange having packing element 32, a higher pressure in compartment 50 will unseat the valve at 34 even though bumper 20 has been moved to the end of slots 26 nearest the spool. Similarly, the central member of stop 16 which contacts button 40 is slightly shorter than fingers 42. Thus either valve will not be jammed against the seat when a stop is contacted. When check valve 15 contacts a stop at either end, the button will first be moved compressing the spring, then the stop will contact the spool, and finally the stop will contact the body of the valve. When the stop contacts the spool, the valve will be unseated at the other end and will tend to seat at the end against the stop. The pressure differential between the compartments after the equalization has taken place will be that pressure equivalent to the differential spring pressure and, since springs 31 and 41 are light, the differential will be very small and for all practical purposes, negligible. Since neither seat of the valve will be jammed by contact with the corresponding stop, and since springs 31 and 41 are weak, the valve can be and will be opened by a higher relative pressure in one of the compartments. The described pressure equalization will occur at the stop 17 side of check valve 15 after the air introduced through pipe 59 has pushed diaphragm 11 into contact with stop 17, so that air will enter compartment 51 until the pressure in compartment 51 is substantially equal to the pressure in compartment 50 and also substantially equal to the pressure of the compressed air supply in line 59.

After the pressure of the air introduced into compartment 50 through line 59 has acted on diaphragm 11 to move check valve 15 into contact with stop 17, and after the check valve 15 has acted to equalize the pressures in compartments 50 and 51, check valve 15 will close because of the pressure of button 30 on spring 31. Check valve 15 will be seated at seat 34, and open at seat 33. The actuator will remain in this condition as long as pressure is maintained in the two compartments 50 and 51 and in line 59, and shaft 3 will remain stationary, having already turned gear 4 while diaphragm 11 was flexing toward stop 17.

When it is desired to return shaft 3 to its original position shown in Figure 2, and simultaneously to rotate gear 4 to its original condition, the three-way valve controlling line 59 is turned so that the compressed air supply is shut off and line 59 is vented to a reduced pressure or to the atmosphere. The pressure in compartment 50 will rapidly drop, but the pressure in compartment 51 will remain elevated since check valve 15 will be more tightly seated at seat 34 because of the pressure in compartment 51. The pressure in compartment 51 will move diaphragm 15 toward stop 16 and check valve 15 into contact with stop 16, and any pressure remaining in compartment 51 will dissipate through check valve 15 in the manner already described. The closure at seat 33 will open up until the pressure differential is substantially dissipated.

In summary, the above described form of the actuator has a single diaphragm which divides a housing or shell into two compartments. When a higher gas pressure is imposed in one compartment the diaphragm flexes toward the second compartment which is at a lower pressure. When the pressure in the second compartment is increased, or when the pressure in the first compartment is decreased, so that a pressure differential prevails in the other direction, the diaphragm flexes back toward the first compartment. A shaft extends through a wall of the shell and engages the diaphragm so that when the diaphragm is flexed, the shaft is moved by the diaphragm. Usually, the shaft is perpendicular to the diaphragm and parallel to the direction of flexure of the diaphragm, and a seal means is provided so that the shaft may slide through the wall of the shell without there being any loss of pressure from the shell at that point. A check valve is provided between the two compartments on either side of the diaphragm, and the check valve is secured in the center of the diaphragm and has the shaft attached to the valve body, so that the check valve body moves and in turn moves the shaft as the diaphragm flexes. A number of types of check valves may be used. A check valve which functions particularly well has been described in connection with Figures 1–4 of the drawings. The check valve must be a type, or a combination of types, which will seal between the two compartments while the barrier means is being moved in either direction, and which will act to equalize the pressure on the sides of the barrier means at the completion of the movement in either direction. A pipe or conduit for conducting compressed gas is attached to one compartment. This same pipe, through a suitable valve arrangement, is also used to vent the compartment to the atmosphere.

An alternative embodiment of the invention to that shown in Figures 1–4 is shown in Figures 5–6 of the drawings. A chamber consists of a center portion 60, a gas inlet end 61, and a shaft end 62. Two diaphragms 63 and 64 are tightly clamped between suitable flanges of the chamber members by bolts, as shown, the diaphragms being somewhat concave in shape, and slack, so that they may flex to either side of the flanges between which they are secured. A shaft 65 is attached to both diaphragms at their centers by suitable clamps 66 and 67 and extends through the shaft end of the chamber at hole 72, which may fit shaft 65 loosely since there is no necessity for a seal at that point. Plate 68 having hole 69 is also clamped by clamp 66 on the side of diaphragm toward the gas inlet end 61. There is a hole 70 in diaphragm 63 spaced from hole 69 as shown. Plate 71 is clamped by clamp 67 on the shaft end 62 side of diaphragm 64. There are no holes corresponding to holes 69 and 70 in diaphragm 64 and plate 71. Compartment 73 is formed by gas inlet end 61 and diaphragm 63. Compartment 74 is formed by center portion 60 of the chamber and diaphragms 63 and 64. A pipe 76, corresponding to pipe 59 in Figure 2, is screwed into gas inlet end 61.

The operation of the embodiment of the invention shown in Figures 5 and 6 is substantially the same as the operation of the preferred embodiment of Figures 1–4. Pressured air, or other gas, is admitted to compartment 73 through pipe 76 while diaphragm 63 is flexed as shown in Figure 6. Diaphragm 64 is at this time also flexed toward air inlet end 61, since both diaphragms flex simultaneously because of their connections to shaft 65. The air introduced to compartment 73 passes through hole 70 into compartment 74, so that the pressures on both sides of diaphragm 63 are substantially the same. As the pressure builds up in compartment 74, diaphragm 64 is pushed toward the shaft end 62 of the chamber, and diaphragm 63 follows diaphragm 64 because of their connnections to shaft 65. When, because of the movement of diaphragm 63, plate 68 is flat against diaphragm 63, hole 70 will be closed. Shaft 65 at this time will have been moved longitudinally from the position shown in Figure 6 to the position shown in Figure 5, meanwhile moving any element fastened to ring 75 to the left. By maintaining the pressure in pipe 76, the shaft will be held in the position shown in Figure 5.

When the air pressure to pipe 76 is cut off and pipe 76 is vented to a reduced pressure or to the atmosphere, the pressure in compartment 73 will drop rapidly. Since diaphragm 63 has about twice the area of diaphragm 64, there will be a resultant force on diaphragm 63 toward the end 61 of the actuator, and this resultant force will be substantially the same as that on diaphragm 64 during the air admitting period already described. Therefore, when pipe 76 is vented, shaft 65 will move from the position shown in Figure 5 to the position shown in Figure 6. Near the end of this movement hole 70 will again open because of the curvature of diaphragm 63 and the pressure in compartment 74 will be vented. Hole 69 in plate 68 is provided to break the seal between plate 68 and diaphragm 63 so that the hole 70 will positively open when the shaft 65 and diaphragms 63 and 64 have fully moved toward the end 61 of the actuator. This second movement of the shaft 65 will return the element connected to loop 75 to its original position, and the actuator is in condition to again be operated by introducing pressured air through pipe 76.

In summary, in this form the actuator has two diaphragms. One diaphragm forms one end of a closed housing or shell and the other diaphragm divides the interior of the shell into two compartments. A check valve described above with reference to Figures 5 and 6 of the drawings, is installed between the two compartments and may be installed in the diaphragm separating the two compartments. Usually the end diaphragm has about half the area of the separating diaphragm. In this embodiment of the invention, compressed gas is introduced into the compartment formed by the shell and the separating diaphragm, and the gas passes through the check valve and into the compartment formed by the end diaphragm, the shell, and the separating diaphragm, equalizing the pressures in the two compartments. There is no pressure differential across the separating diaphragm, but a pressure is imposed on the end diaphragm forcing it outward. The shaft, in this case being connected to the centers of both diaphragms, moves the separating diaphragm as the shaft is moved by the end diaphragm, so that when the end diaphragm is flexed outwardly, the separating diaphragm is similarly flexed in the same direction. When the end diaphragm has been fully flexed outwardly by the imposition of gas pressure in the two compartments, the check valve closes, and remains closed as long as pressure is maintained in both compartments and thereafter until the diaphragms have both been flexed back in the other direction. When the compartment formed by the shell and the separating diaphragm is vented to atmospheric pressure, a higher pressure obtains in the other compartment and the diaphragms are flexed in the other direction, at the same time also moving the shaft in the same direction. Near the end of this flexure, the check valve again opens and vents any gas pressure to the atmosphere. Since the separating diaphragm has twice the surface area of the end diaphragm the forces of movement of the shaft in both directions are equal. In one direction, the pressure acts only on the smaller end diaphragm, and in the other direction the pressure acts in that direction on the larger separating diaphragm and oppositely on the smaller end diaphragm so that the net force is the equivalent of the force on the smaller diaphragm.

Figure 7 of the drawings shows a check valve which may be used in the embodiment of the invention shown in Figures 5 and 6 in place of the two holes 69 and 70 in plate 68 and diaphragm 63. When this valve is used, diaphragm 63 will have a larger hole 85 and plate 68 will have a plurality of holes 86 which coincide with hole 85 when the diaphragm and plate are in flush contact. A valve 81 covers hole 85 and is held in place by shaft 82, bushing 84, and spring 83, as shown. Spring 83 is a relatively weak spring so that when compressed gas is introduced into compartment 73 valve 81 will open and the pressures in compartments 73 and 74 will become substantially equal. When compartment 73 is later vented to a lower pressure, the higher pressure in compartment 74 will keep valve 81 closed until near the end of the flexure of diaphragm 63, at which time the bushing 84 will strike cover 61 to unseat valve 81 and vent compartment 74 to atmospheric pressure or to a reduced pressure. The operation of the actuator having this valve is the same as that already described with reference to Figures 5 and 6.

Another embodiment of the invention is shown in Figures 8 and 9 of the drawings. The actuator shown resembles the embodiment of Figures 1–4, but has a piston in place of the diaphragm. In Figures 8 and 9, the same reference numerals are used as are used in Figures 1–4 wherever the elements are the same. The housing of the actuator is formed by shell 107 and cover 108, which are modified to receive piston 111. Piston 111 has ring packing means 112 about its edges so that a sealed sliding engagement is had between piston 111 and the inside wall of shell 107. The inside wall of shell 107 is smooth and shell 107 is of uniform diameter so that piston 111 will function properly as therein received. Ring packing means 112 is shown disposed in grooves 114, but other packing means and other means for holding the packing may be used. Check valve 15 is screwed into threaded bore 113 of piston 111 as shown. Other means may be used to secure check valve 15 in piston 111.

In summary, in this form of the invention, piston means is used instead of the diaphragm means as the barrier means. The apparatus is the same except that the shaft which acts to operate an element of an apparatus is moved by the movement of a piston means instead of by flexure of a diaphragm means. In all other respects the actuator is the same, and the actuator may have only one piston or may have a plurality of pistons.

The shapes of shell 107 and cover 108 are shown modified to receive piston 111 and to allow for the movement of piston 111 when the actuator is operated. To this end, cover 108 is flat instead of having the bell shape of cover 8 as shown in Figures 1 and 2.

Operation of the embodiment of Figures 8 and 9 is identical with operation of the embodiment of Figures 1–4. Piston 111, replacing diaphragm 11, slides within shell 107 to alter the sizes of compartments 50 and 51, and shaft 3 is moved to operate an element of an apparatus as already described.

The embodiments of Figures 5–7 may likewise be altered to include piston means instead of diaphragm means, as will be obvious to those skilled in the art.

Any of the actuators shown in Figures 1–9 may be operated by pressured liquids as well as by pressured gases. Referring now to Figures 10–12 of the drawings, the apparatus of Figures 8–9 is shown installed for liquid operation. The actuator is connneced to a valve 2 in the manner heretofore described with reference to Figures 1 and 2. An accumulator 120 is connected to the actuator at threaded outlet 45 by means of a short curved pipe nipple 121. Liquid under pressure is supplied to the actuator through pipe 59, and the flow of liquid to and from the actuator through pipe 59 is controlled by a three-way valve as in the case of gas operation of the actuator.

The actuator is disposed at an angle so that liquid may drain out of compartment 51 through check valve 15. The angle at which the actuator is disposed may be any angle such that a considerable quantity of liquid in compartment 51 will drain when piston 111 is moved so that valve 15 is against stop 16. The actuator may be disposed with shaft 3 vertical. Alternatively, the actuator may be modified such that valve 15 is at a low point of piston 111, in which case shaft 3 may be at any angle. The important consideration is to provide drainage from compartment 51 when valve 15 is opened, and this may be done in any suitable way.

Accumulator 120 has a lower shell 122 and an upper shell 123, which may be identical. Each shell forms half of the accumulator chamber, the shells being bolted together at their respective flanges 124, 125. A flexible diaphragm 126 is held at its edges between flanges 124, 125, and the diaphragm divides the accumulator chamber into two compartments 127, 128, which are of variable size because of the flexure of the diaphragm 126. The pipe nipple 121 is threadingly connected to lower shell 122 at lower threaded opening 129 so that fluid may flow between compartment 51 of the actuator and compartment 127 of the accumulator. Upper shell 123 has an upper threaded opening 130 for threaded connection with a pipe 131. Pipe 131 leads to a valve (not shown) and a pump (not shown) or other source of pressured gas or air, by means of which pressured gas or air is introduced into compartment 128 of the accumulator before the actuator is put into service.

The operation of the liquid-operated embodiment of the invention shown in Figures 10–12 is similar to the operation of the other embodiments. Preparatory to putting the actuator into operation pressured gas is introduced into compartment 128 of the accumulator through line 131 and opening 130, the valve (not shown) in line 131 afterward being closed to hold the pressure in compartment 128. Referring to Figure 11, the pressured gas flexes diaphragm 126 downwardly toward the bottom of shell 122. The pressure of the gas in compartment 128 may be any pressure less than the pressure of the pressured fluid to be used for operating the actuator, and it is usually preferred that the gas pressure in compartment 128 be about half the pressure of the operating fluid supply. When the actuator is first operated, the actuator elements are in the positions shown in Figure 11, except that there is no liquid level 132 until after the first operation of the actuator. Piston 111 is in its lower position and valve 15 is closed and against stop 16. To operate the actuator to extend shaft 3 from its withdrawn position shown in Figure 11, pressured liquid is admitted to compartment 50 of the actuator through line 59, the three-way valve (not shown) in line 59 being suitably adjusted for this purpose. The initial surge of pressured liquid moves piston 111 away from stop 16 and keeps valve 15 closed at seat 33. Valve 15 remains closed as the pressured liquid entering compartment 50 drives piston 111 toward stop 17, compressing the gases in actuator compartment 51 and in accumulator compartment 127. During this movement of piston 111, the pressure of the compressed gases in compartments 51 and 127 is sufficient to flex diaphragm 126 upwardly very little, if at all, since a relatively high pressure, usually about half the incoming liquid pressure, prevails in compartment 128 above the diaphragm. When piston 111 has been moved to bring bumper 20 of valve 15 against stop 17, valve 15 opens at seat 33 because of the compression of spring 31. When valve 15 opens, liquid flows through the valve from compartment 50 into compartment 51, and thence through pipe nipple 121 into accumulator compartment 127, whereupon the higher pressure of the incoming liquid flexes diaphragm 126 upwardly to the position shown in Figure 12. Valve 15 will remain open until the pressures to either side of piston 111 are substantially equal, spring 31 being a relatively weak spring, and then valve 15 will close at seat 32. When the actuator is in the condition shown in Figure 12, the pressures in compartments 50, 51, 127, and 128 are substantialy equal to the pressure of the operating liquid introduced through pipe 59, the pressures across both piston 111 and diaphragm 126 being substantially balanced. The compressed gas in compartment 128 has been further compressed to a volume approximately half its initial volume and is at a pressure approximately twice its initial pressure. The air or other gas originally in compartments 50, 51, and 127 has been compressed to a smaller volume as indicated above liquid level 133 in Figure 12 below diaphragm 126. Shaft 3 has been moved to its extended position and has moved the element of the apparatus to control it.

When it is desired to return shaft 3 to its withdrawn position, the three-way valve (not shown) is adjusted to a position to drain the liquid out of compartment 50 through pipe 59, thereby rapidly reducing the pressure beneath piston 111. Piston 111 then begins moving toward stop 16 under the influence of the higher pressure above the piston, which keeps valve 15 closed. As the piston moves downwardly, the pressure in compartments 51 and 127 is maintained high by expansion of the gas above diaphragm 126, diaphragm being flexed downwardly. When piston 111 has been moved to bring valve 15 into contact with stop 16, spring 41 will be compressed to urge valve 15 to open at seat 34 and permit most of the liquid above piston 111 to drain out through valve 15 and line 59. The liquid will drain down to liquid level 132 in Figure 11, level with a bumper slot 26 of valve 15. With the actuator in different positions and when the arrangement of the barrier valve is different, the liquid drain level will, of course, be different. Subsequent cycles of operation of the actuator are like the cycle described, the small amount of liquid above the piston not affecting the operation of the actuator.

When the actuator is operated by a liquid instead of by a gas, the actuator may be disposed at an angle so that liquid may drain through the valve in the barrier means. Alternatively, the valve may be placed at a low point of the barrier means to enable the liquid to drain past the barrier means. The actuator may be positioned with its axis vertical for the same purpose. Actuators having piston barrier means are usually used when the actuator is to be operated by a liquid because of the higher pressures involved, but diaphragm actuators may also be operated with a liquid pressuring medium.

Any type of liquid may be used to operate the actuator embodiment of Figures 10–12, and as mentioned earlier gas operated embodiments may include the use of accumulators having or not having a barrier means 126 therein. A piston may be substituted for the diaphragm in the accumulator in which case the accumulator will be of cylindrical form. In some installations pressured liquid or gas in the flow line controlled by the actuator may be used to operate the actuator.

While preferred embodiments of the invention have been shown and described herein, many modifications thereof may be made by a person skilled in the art without departing from the spirit of the invention, and it is intended to protect by Letters Patent all forms of the invention falling within the scope of the following claims.

I claim:

1. An actuating device comprising two chambers separated by a diaphragm, valve means disposed through the center of said diaphragm and supported thereby, a conduit means communicating with only one of said chambers, and shaft means connected to said diaphragm and slidingly received through a sealing means in a wall of one of said chambers; said diaphragm being flexible and capable of being flexed alternately into each of the two chambers and imparting a longitudinal movement to said shaft means, said conduit means supplying compressed gas to only one of said chambers to flex said diaphragm, said valve means equalizing the pressure in the two chambers after full flexure of the diaphragm into either of said chambers, said conduit means venting said one of said chambers to a lower pressure so that the compressed gas in the other chamber flexes said diaphragm back in the other direction, said valve means and conduit means venting both chambers to a lower pressure after the completion of the diaphragm flexure cycle.

2. An actuating device having shaft means connected to a diaphragm means, including a flanged open ended housing having a correspondingly flanged cover, said diaphragm being held tightly between the flanges of the housing and cover and forming two chambers within said housing and cover, including a check valve disposed through a hole substantially at the center of said diaphragm means and sealed thereto, said check valve sealing between the chambers thus formed on either side of said diaphragm by said housing and cover substantially during the time that said diaphragm is flexing, and said check valve communicating between said chambers substantially during the time that said diaphragm is fully flexed; including stops against which said check valve abuts upon flexure of the diaphragm into either of said chambers, one of said stops being fixed and formed as an integral open ended hollow cylinder on the closed side of said housing and the other of said stops being adjustable, said other stop being screwed through said cover and having an adjusting knob outside of said cover, the end of said first stop contacting said check valve on one full flexure motion of said diaphragm and the end of said second stop contacting the other end of said check valve on the other full flexure motion of said diaphragm; including connecting means between said shaft and said diaphragm means so that said shaft is moved longitudinally in the direction of motion of said diaphragm while it is flexing, sealing means being provided whereby said shaft can slide through a hole in said housing located within the hollow first stop; including a conduit means communicating through said cover and suitable means for controllably varying the fluid pressure in said conduit means to vary the fluid pressure in the chamber at the cover side of said diaphragm; said check valve acting to alternate the relative pressure differentials between the two chambers as the pressure in the chamber having said conduit is varied.

3. An actuating device comprising a chamber, a movable barrier means dividing said chamber into two zones and, being movable between fully moved positions into each of said two zones, said barrier means including a valve means therethrough communicating across said barrier means between said two zones, shaft means connected to said barrier means at one end thereof and extending therefrom to the exterior of said chamber and movable with said barrier for actuating other devices, means for admitting pressured fluid to one zone of said two zones and for withdrawing said pressured fluid from said one zone, the other zone of said two zones being closed and having no communication with the exterior of said chamber except through said barrier valve means, said valve means allowing flow of said pressured fluid from said first zone into said second zone only when said barrier means is fully moved into said second zone and allowing flow of said pressured fluid from said second zone into said first zone only when said barrier means is fully moved into said first zone, said valve means in addition allowing the pressures of said pressured fluid to be equalized between said two zones when said barrier means is fully moved into either of said two zones.

4. The combination of claim 3, said movable barrier means being a piston slidingly and sealingly disposed within said chamber.

5. The combination of claim 3, said movable barrier means being a flexible diaphragm sealed therearound to the walls of said chamber.

6. An actuating device comprising a chamber, a barrier means dividing said chamber into two zones, a valve means disposed through said barrier means to provide controlled communication between said two zones, one zone of said zones having a valved inlet-outlet to the exterior of said chamber, the other zone of said two zones having communication therefrom to said one zone and to said chamber exterior only through said valve means disposed through said barrier means and forming a reservoir for pressured fluid entering thereinto from said one zone, said valve means including a tubular body sealingly extending through said barrier means and having connection means fixedly carried at an end thereof, shaft means connected at one end thereof to said connection means on said tubular body and extending therefrom sealingly and slidingly from a said zone at the side of said barrier means at which said connection means is disposed, said barrier means being movable between extended positions thereof into each of said zones, and said valve means being responsive to alternating fluid pressures in said one zone to produce oppositely alternating fluid pressures in said other zone.

7. An actuating device as defined by claim 6 wherein the tubular body of said valve means has a seat at each end thereof, and includes a valve spool reciprocably disposed in said tubular body, a valve at each end of said valve spool, each said valve being seatable at the corresponding seat to close said body, biasing means actuable to bias each said valve toward closed position, and means adapted to actuate one said biasing means upon movement of said barrier means into either of said extended positions.

8. An actuating device as defined by claim 7 wherein said means adapted to actuate said biasing means comprises a stop in each of said zones each positioned for engagement with one end of said valve spool upon movement of said barrier means into the corresponding extended position, and including a cavity in each end of said valve spool, a compression spring in each said cavity, and a reciprocable actuating button extending from the outer end of the spring through and beyond the end of the valve spool, whereby said button contacts said stop before the valve spool contacts the stop.

9. An actuating device comprising a pair of contiguous compartments, pressure-movable barrier means forming a common wall between said compartments, and means for feeding a pressure fluid into and exhausting fluid from only one of said compartments, said barrier means including a shaft to which motion is imparted upon movement of said barrier means and valving means actuable to provide communication in either direction between said compartments when said barrier means is moved to substantially its fullest extent in at least one direction and to prevent communication between said compartments while said barrier means is being moved in either direction.

10. An actuating device as defined by claim 9 wherein said barrier means is a flexible diaphragm, and said valving means comprises a plate affixed to said diaphragm, an aperture in said plate, and an aperture in said diaphragm which is spaced away from the aperture in the plate.

11. An actuating device as defined by claim 9 wherein said valving means is supported by and moves with said barrier means, and including stop means in each of said compartments to open said valving means upon contact therewith.

References Cited in the file of this patent

UNITED STATES PATENTS

| | | |
|---|---|---|
| 204,914 | Prince | June 18, 1878 |
| 291,826 | Wilson | Jan. 8, 1884 |
| 561,747 | Worthington | June 8, 1896 |
| 896,211 | Jenkins | Aug. 18, 1908 |
| 2,457,721 | Price | Dec. 28, 1948 |
| 2,532,462 | Rockwell | Dec. 5, 1950 |
| 2,532,960 | Stelzer | Dec. 5, 1950 |
| 2,661,726 | Alfieri | Dec. 8, 1953 |
| 2,662,512 | Schaffer | Dec. 15, 1953 |
| 2,709,420 | Fullwood et al. | May 31, 1955 |
| 2,744,502 | Frantz | May 8, 1956 |
| 2,746,425 | Schafer | May 22, 1956 |